3,464,025
GAS LASERS
William E. Bell, Palo Alto, Calif., assignor to Spectra-Physics, Inc., Mountain View, Calif., a corporation of California
Filed May 25, 1964, Ser. No. 369,853
Int. Cl. H01s 3/22
U.S. Cl. 331—94.5                    24 Claims

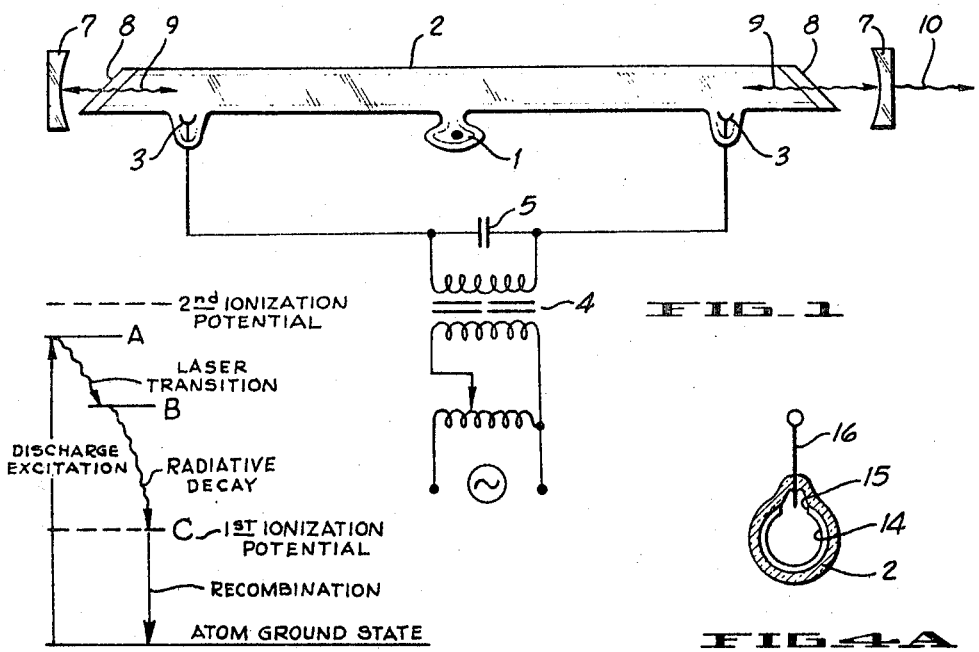
FIG_1
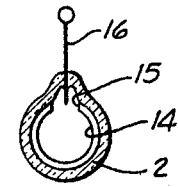
FIG_4A
FIG_2
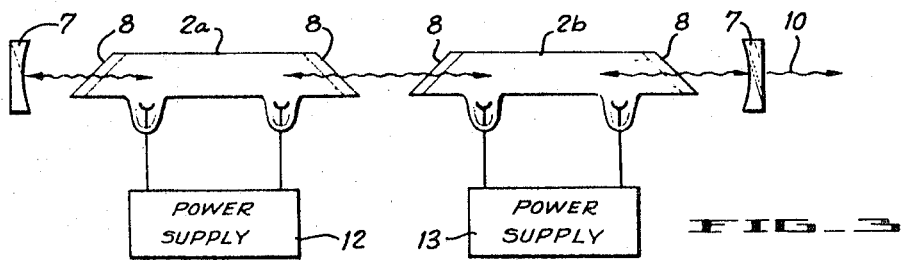
FIG_3
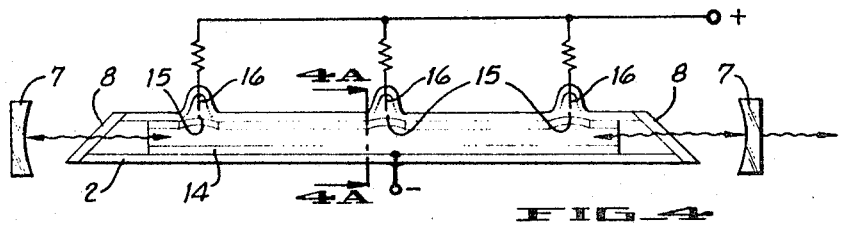
FIG_4
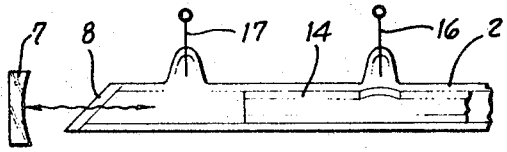
FIG_5
WILLIAM E. BELL
INVENTOR.
BY J. E. Rosenblum
ATTORNEY

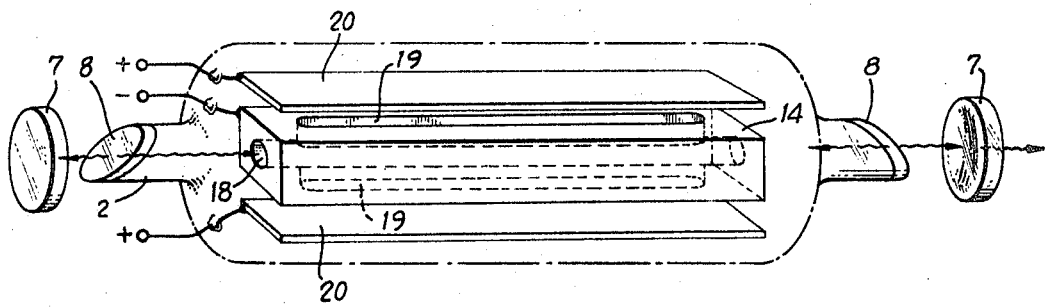
FIG_6
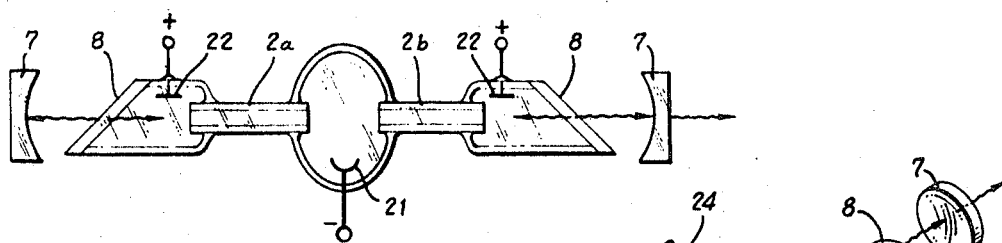
FIG_7
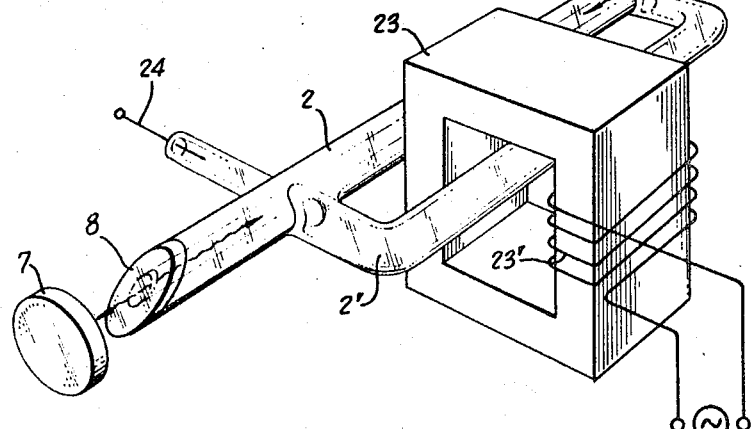
FIG_8
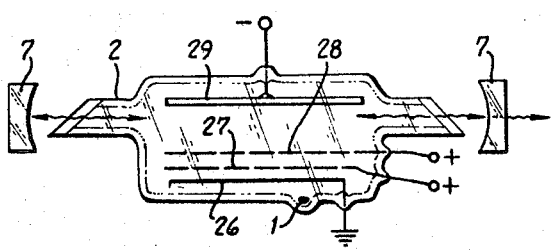
FIG_9
WILLIAM E. BELL
INVENTOR.
BY J.E. Rosenblum
ATTORNEY United States Patent Office 3,464,025
Patented Aug. 26, 1969

ABSTRACT OF THE DISCLOSURE

A gas laser in which the laser radiation results from electronic transitions of gaseous ions under the influence of a high current density discharge. In various modifications, the high current density is obtained by high-voltage diode discharges, hollow cathode discharges, discharges induced by an external alternating field source, and electron gun excitation.

---

Considerable work has been done in recent years in the development of the gas laser as an optical radiation source having a very high degree of temporal and spatial coherence. Previously known gas lasers have, however, been subject to fundamental limitations regarding maximum power and the number of wavelengths of operation.

I have discovered that it is possible to derive laser radiation from electronic transitions in gaseous ions, and that such radiation has unique characteristics which serve to overcome fundamental limitations of previous gas lasers (which derive laser radiation from electronic transitions in neutral atoms or molecules). This discovery, first reported by me in an article entitled "Visible Laser Transitions in Hg$^+$" appearing in Applied Physics Letters, vol. 4, page 34, Jan. 15, 1964, forms the basis of the present invention.

The various features and advantages of the present invention will become apparent upon a consideration of the following specification, taken in connection with the accompanying drawing, wherein the same numeral is used in the various figures to designate similar elements and:

FIGURE 1 is a partially schematic elevational view of a gas laser in accordance with the present invention;

FIGURE 2 is a simplified energy level diagram illustrating certain electronic transitions of importance to the present invention;

FIGURE 3 is a partially schematic elevational view of another embodiment of a gas laser in accordance with the present invention;

FIGURE 4 is a partially schematic elevational view of another embodiment of a gas laser in accordance with the present invention;

FIGURE 4A is a cross-sectional view taken along line 4A—4A in FIGURE 4;

FIGURE 5 is a fragmentary elevational view showing a modification to the laser of FIGURE 4;

FIGURE 6 is a simplified isometric view of another embodiment of a gas laser in accordance with the present invention;

FIGURE 7 is a partially schematic elevational view of another embodiment of a gas laser in accordance with the present invention;

FIGURE 8 is a simplified isometric view of another embodiment of a gas laser in accordance with the present invention; and FIGURE 9 is a partially schematic elevational view of another embodiment of a gas laser in accordance with the present invention.

FIGURE 1 shows apparatus of the type used for my original discovery of the laser action of gaseous ions. The active material is mercury vapor supplied from reservoir 1 to a glass plasma tube 2 (2.25 meters long with a 15 millimeter bore) at a pressure of $10^{-3}$ torr mixed with an inert gas carrier (preferably helium) at a pressure of between 1 and 2 torr.

Power is provided to discharge electrodes 3 by means of 60 cycle, 115 volt line power stepped up to a maximum of 15 kilovolts by variable-input transformer 4. The transformer output is placed across a .025 microfarad capacitance 5 which delivers current pulses to the plasma at a repetition rate of 120 per second.

The reversal of the polarity of the electrodes 3 from pulse to pulse aids in controlling the diffusion of the mercury vapor through the helium. This results from the fact that the mercury has a lower ionization potential than the helium and is pulled by cataphoresis through the helium towards whichever electrode is negative.

The plasma tube 2 is placed inside an optical resonator consisting of two optically-facing dielectrically-coated reflectors 7 (3-meter radius of curvature) having a high reflectance at the desired operating wavelength. The axially propagated radiation 9 at this wavelength is directed, via windows 8 inclined at Brewster's angle for maximum transmission, to reflectors 7 which reflect the radiation back and forth a sufficient number of times to sustain laser oscillation. Some degree of transmission is provided at the operating wavelength through at least one reflector 7 to provide an output beam 10.

Laser operation has been achieved with this apparatus at a number of wavelengths corresponding to electronic transitions in singly-ionized mercury (Hg II spectral lines) including 5677, 6150, 7346, 8547, 8628, 9396, 10,586, 11,181, and 15,550 (measured in Angstrom units). Using a 60 centimeter, 5 millimeter bore plasma tube containing argon at a pressure of between $10^{-3}$ and $10^{-2}$ torr, laser operation was also achieved at 4879 A. which corresponds to an electronic transition in singly-ionized argon (AII spectrum).

The following remarkable properties of the above laser radiation were observed:

(1) Laser operation was readily achieved at visible wavelengths, including the blue-green portion of the spectrum where practical laser operation had heretofore not been obtained.

(2) Very lossy elements could be inserted inside the optical resonator without quenching the laser oscillation. A transmitting filter of 50% absorption could be used with the 5677 A. operation, corresponding to a stimulated emission gain on the order of 100% per meter.

(3) The apparatus was used with several different plasma tube bore diameters, including 3.5 mm., 8 mm., and 15 mm., without any substantial change in gain.

The apparent explanation of these phenomena follows from a consideration of the electronic transitions shown in the simplified energy level diagram of FIGURE 2. The dependence of the operating wavelength with excitation conditions, at least in the case of mercury, indicates that the upper level A of the laser transition is populated by direct ionizing impact between neutral atoms and electrons in the discharge. It is also possible that ion-ion collisions contribute to the upper state population. The lower level B of the laser transitions is connected to the ionic ground state C by strongly allowed ultra-violet radiative transitions. The ions then return to the ground state by recombination with discharge electrons and repeat the foregoing process, or alternatively they may be excited by collision processes from the ionic ground state C. Similar considerations apply to multiply-ionized as well as singly-ionized atoms and molecules, all of which are within the scope of the present invention.

The availability of visible transitions results from the fact that the energy levels of the ions are more spread out than those of neutral atoms, so that a higher percentage of the total population of excited states can undergo the large energy difference quantum transitions which yield the short visible wavelengths. The 5677 A. green output from the mercury ion laser is of special importance since it is near the peak sensitivity of most photodetectors as well as the human eye.

The high gain is a consequence of the maintenance of a population inversion by virtue of the effective disposal of the population of the lower laser level B. In previously known lasers using neutral atom transitions, there is a severely limiting gain saturation due to resonance trapping of radiation between the lower laser level and metastable levles situated below this level. This is substantially overcome in the ion laser, apparently because the ground state ions are exposed to the discharge field sufficiently long to experience velocity effects which reduce the resonance absorption at the wavelength of the radiative decay, and yet have sufficiently short lifetimes that no population bottleneck is cerated.

The availability of high gain has a number of significant aspects. For example, it permits the insertion of various elements inside the optical resonator where the coherent radiation field is strong; thus, for example, non-linear crystals may be inserted to generate harmonics of the operating optical frequency, specimens may be inserted for purposes of scattering experiments such as Raman spectroscopy, and/or lenses may be used to focus the intra-resonator radiation to spots of very high power density. Also the laser can readily be made 10 centimeters or less in length with sufficient gain for oscillation. Such short lasers have the advantage that the axial or frequency modes of the optical resonator are sufficiently separated that oscillation is obtained at a single frequency.

Again, in the previously-known neutral atom lasers, the gain is found to be inversely dependent on the plasma tube diameter, due to the need for depopulating the saturating metastable states by wall collisions. The lack of this diameter dependence in the ion laser indicates that the wall-independent depopulation processes, such as radiative decay and recombination, are effective to prevent gain saturation. This is of special significance in that the power of the ion laser can be increased simply by using larger diameter plasma tubes.

The particular wavelength of operation as between the 5677 A. and 6150 A. transition of the mercury ion, for example, depends on the excitation conditions. In particular, I have found that in the apparatus of FIGURE 1 a three microsecond discharge pulse results in a 5677 A. output whereas a two microsecond pulse results in a 6150 A. output, apparently due to the fact that the longer pulse provides sufficient energy for populating the higher upper state from which the 5677 A. transition originates. Similarly faster pulse rise times are found to favor the 5677 A. output. Usually it is desirable to limit the output to a single wavelength. FIGURE 3 shows an arrangement for obtaining a simultaneous output when so desired. Here the plasma tube is divided into two parts, with part 2a being driven by a power supply 12 optimized for operation at one wavelength and part 2b being driven by a separate power supply 13 optimized for operation at the other wavelength. The reflectors 7 have sufficient bandwidth to sustain operation at both wavelengths.

In various embodiments of the present invention it may be desirable to include a radio-frequency-driven coil around the outside of the plasma tube as an additional or alternative discharge-producing means. For example, the radio-frequency field can maintain a constant supply of ions which will permit more rapid initiation of operation upon excitation of the internal electrodes 3.

The current density required for ion laser operation in a discharge tube as shown in FIGURE 1 is on the order of 1 amp/mm.$^2$ This places rather stringent requirements on the power supply when it is desired to operate the laser at high powers, fast pulse repetition rates, or continuously rather than on a pulsed basis. One approach is to reduce the bore diameter considerably so as to reduce the total current required; however, this places a limitation on output power. I have discovered that reduction in input power requirements can also be achieved by the use of a hollow cathode discharge in which a strong negative glow field is created inside the cathode. The optical emission of this negative glow contains very sharp spectral lines arising from electronic transitions of ions (spark spectra), and the parameters of the discharge can be readily adjusted to optimize the population of the upper energy level of a desired laser transition. The negative glow discharge creates the energetic electrons required for excitation to such a level with economical power inputs.

In the embodiment of FIGURE 4, a plurality of openings 15 are made in a cylindrical cathode sleeve 14, and anode pins 16 are placed adjacent these openings to create a hollow cathode discharge. Using a 24-inch tube 14 made from graphite with twenty anodes 16, the input power requirements for laser operation were reduced by several orders of magnitude. When using certain types of ions, say cadmium or zinc, it may be desirable to plate the cathode sleeve 14 and generate ions by sputtering of the cathode surface. In this case, an auxiliary anode, such as 17 in FIGURE 5, can be used to drive the cathode ions back by cataphoresis and thereby prevent sputtering of cathode material on the windows 8.

Another embodiment using a hollow cathode discharge is shown in FIGURE 6. Here the cathode 14 is formed from a block of graphite with a longitudinal cylindrical opening 18 for passage of the optical radiation and connecting transverse slot openings 19. The anodes 20 are spaced adjacent the slots 19 such that the effective discharge field extends inside the cathode block 14. Since the discharge field is substantially transverse to the optical axis, this embodiment may additionally suppress some of the broadening of the laser emission line which results from field-induced ion motion along the optical axis.

Another feature of the embodiment of FIGURE 6 is that the use of two anodes brings ions into the optical path from opposite directions, thereby enhancing ion-ion collisions when desired as a mechanism for populating the upper laser level. Another embodiment incorporating this feature is shown in FIGURE 7. Here two glass tubes 2a and 2b, disposed along the optical axis, interconnect an enlarged central region containing cathode 21 and enlarged end regions containing anodes 22 which serve to drive ions into the optical axis region from opposite directions.

FIGURE 8 discloses an arrangement for conveniently generating high current densities in an ion laser. Here an appendage 2' is used to form the plasma tube 2 into a toroidal configuration such that the discharge acts as a single-turn secondary winding of a transformer 23 driven by a multi-turn primary winding 23', whereby the discharge current, initiated by starting electrodes 24 (if necessary), is stepped up by the turns ratio of the transformer. The discharge is maintained in the active gaseous medium with current induced by an alternating magnetic field established by an excitation source which is external to the plasma tube. This configuration has the additional advantage of avoiding problems, such as sputtering and clean-up, which can be caused by high energy electrodes inside the plasma tube.

In the case of mercury vapor, for example, the addition of the inert carrier gas facilitates the breakdown required for discharge initiation. There is some evidence, however, that the carrier gas can have a detrimental depopulating effect. The use of an electron gun for purpose of excitation would enable the elimination of the carrier gas, and also would permit precise control of excitation energy for selective population of the upper level of a desired laser transition. A tetrode embodiment using electron gun excitation is shown in FIGURE 9. The electrons emitted by cathode 26 are controlled in energy by the positive voltage applied to the control grid 27, thereby creating the desired excited ions upon collision with the gas atoms. The second grid 28 is biased a few volts positive with respect to the control grid 27 in order to collect the soft electrons resulting from the ionization. The negatively-biased ion collector 29 serves to draw the excited ions into the optical radiation path between grid 28 and collector 29.

I claim:

1. A gas laser comprising: an active gaseous medium; and means for ionizing said medium and populating an excited electronic state of the gaseous ions therein to produce laser radiation, said laser radiation being established by optical radiation resulting from electronic transitions of said gaseous ions from said excited state to a lower state.

2. A gas laser according to claim 1 including an optical resonator for effecting multiple reflections of said optical radiation through said medium.

3. A gas laser according to claim 1 wherein said ions are characterized by electronic transitions from said lower state, said transitions resulting in radiation, and said ions decay from said lower state by undergoing said transitions.

4. A gas laser according to claim 1 wherein said ions are mercury ions.

5. A gas laser according to claim 4 including means for establishing laser radiation in each of two separate regions of said medium, the radiation in one of said regions being at a wavelength of approximately 5677 A. and the radiation in the other of said regions being at a wavelength of approximately 6150 A.

6. A gas laser according to claim 1 wherein said ions are characterized by electronic transitions to said lower state, said transitions resulting in visible wavelength radiation, and said ions undergo said transitions to produce said visible wavelength radiation as said optical radiation.

7. A gas laser according to claim 6 wherein said ions are mercury ions and said optical radiation is at a wavelength of approximately 5677 A.

8. A gas laser according to claim 1 including means for establishing a hollow cathode discharge in said gaseous medium.

9. A gas laser according to claim 8 including a hollow cathode sleeve having a plurality of openings therein, and a plurality of anode structures positioned adjacent said openings.

10. A gas laser according to claim 9 including a plated hollow cathode structure, said gaseous ions being generated by sputtering of said cathode structure.

11. A gas laser according to claim 8 wherein said gaseous medium is contained in a container with at least one window through which said optical radiation is propagated, and further including an auxiliary anode adjacent said window to prevent sputtering of the cathode material thereon.

12. A gas laser according to claim 8 including a hollow cathode block with an axial opening therethrough for passage of optical radiation, said block having at least one transversely extending slot communicating with said axial opening, and an anode plate structure positioned adjacent said slot.

13. A gas laser according to claim 1 including means for directing ions towards each other from opposite directions.

14. A gas laser according to claim 1 wherein said gaseous medium is formed into a toroidal configuration, and further including a transformer which drives said gaseous medium as a secondary winding.

15. A gas laser according to claim 1 including an electron gun for generating controlled-energy electrons which bombarb said gaseous medium to thereby populate a selected excited electronic strate of said gaseous ions.

16. A gas laser according to claim 15 including an electron-emissive cathode and a control grid to which a voltage is applied for controlling the energy of said electrons.

17. A gas laser according to claim 1 wherein said means for ionizing said medium and populating an excited electronic state of the gaseous ions therein consist of means for establishing an electrical discharge in said medium.

18. A gas laser according to claim 17 wherein said electrical discharge is run at a current density on the order of 1 amp/mm.$^2$.

19. A method of generating laser radiation, which comprises: ionizing a gaseous medium and populating an excited electronic state of the gaseous ions therein, and establishing laser radiation by optical radiation resulting from electronic transitions of said gaseous ions from said excited state to a lower state.

20. A gas laser according to claim 16 including an ion collecting electrode for drawing said gaseous ions into the desired region of optical emission.

21. A gas laser according to claim 20 including a second grid, interposed between said control grid and said ion collecting electrode, for removing electrons from said gaseous medium.

22. A gas laser according to claim 1 including means external to said gaseous medium for establishing an alternating magnetic field which induces current to maintain a discharge in said gaseous medium.

23. A gas laser according to claim 1 wherein said ions are cadmium ions.

24. A gas laser according to claim 1 wherein said ions are zinc ions.

References Cited

UNITED STATES PATENTS

| | | | |
|---|---|---|---|
| 3,149,290 | 9/1964 | Bennett et al. | 331—94.5 |
| 3,164,782 | 1/1965 | Ordway | 331—94.5 |
| 3,395,364 | 7/1968 | Bridges | 331—94.5 |

JEWELL H. PEDERSEN, Primary Examiner

W. L. SIKES, Assistant Examiner

U.S. Cl. X.R.

330—4.3